(12) United States Patent
Larsén

(10) Patent No.: US 12,426,537 B2
(45) Date of Patent: Sep. 30, 2025

(54) TOOL DETECTION IN HAND-HELD POWER TOOLS

(71) Applicant: HUSQVARNA AB, Huskvarna (SE)

(72) Inventor: Martin Larsén, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 660 days.

(21) Appl. No.: 17/632,846

(22) PCT Filed: Jul. 7, 2020

(86) PCT No.: PCT/EP2020/069103
§ 371 (c)(1),
(2) Date: Feb. 4, 2022

(87) PCT Pub. No.: WO2021/023453
PCT Pub. Date: Feb. 11, 2021

(65) Prior Publication Data
US 2022/0272898 A1 Sep. 1, 2022

(30) Foreign Application Priority Data
Aug. 5, 2019 (SE) .................................... 1950912-4

(51) Int. Cl.
*A01D 34/90* (2006.01)
*A01D 34/00* (2006.01)
(Continued)

(52) U.S. Cl.
CPC ........... *A01D 34/90* (2013.01); *A01D 34/006* (2013.01); *A01D 34/416* (2013.01); *B25F 3/00* (2013.01); *A01D 34/84* (2013.01)

(58) Field of Classification Search
CPC .... A01D 34/006; A01D 34/90; A01D 34/416; A01D 34/84; B25F 3/00
(Continued)

(56) References Cited

U.S. PATENT DOCUMENTS 4,696,108 A * 9/1987 Zerrer .................... A01D 75/18
30/296.1
6,438,446 B1 8/2002 Trachier
(Continued)

FOREIGN PATENT DOCUMENTS

CN 102765010 A 11/2012
CN 106142016 A 11/2016
(Continued)

OTHER PUBLICATIONS

International Search Report and Written Opinion for International Application No. PCT/EP2020/069103 mailed Nov. 13, 2020.
(Continued)

*Primary Examiner* — Adam J Eiseman
*Assistant Examiner* — Robert D Cornett
(74) *Attorney, Agent, or Firm* — Burr & Forman

(57) ABSTRACT

A hand-held multi-tool device (100) comprising a driving unit (105) and being arranged to carry one of a plurality of replaceable tool heads (150) to be driven by the driving unit (105), the hand-held multi-tool device (100) further comprising a controller (101) configured to: determine a baseline inertial characteristic of the tool head currently being driven by the driving unit; determine an active inertial characteristic of said tool head; and determine a tool type for the tool head (150) based on the active inertial characteristic and the baseline inertial characteristic.

13 Claims, 5 Drawing Sheets

(51) Int. Cl.
*A01D 34/416* (2006.01)
*A01D 34/84* (2006.01)
*B25F 3/00* (2006.01)

(58) Field of Classification Search
USPC .......................................................... 30/276
See application file for complete search history.

(56) References Cited

U.S. PATENT DOCUMENTS

| | | |
|---|---|---|
| 2005/0000333 A1 | 1/2005 | Schittl et al. |
| 2012/0318545 A1 | 12/2012 | Schreiber |
| 2014/0070924 A1 | 3/2014 | Wenger et al. |
| 2015/0137721 A1* | 5/2015 | Yamamoto ............... H02P 6/08 318/400.15 |
| 2016/0342142 A1 | 11/2016 | Boeck et al. |
| 2017/0008159 A1* | 1/2017 | Boeck .................... G05B 19/00 |
| 2018/0071907 A1 | 3/2018 | Myhill |
| 2018/0092297 A1 | 4/2018 | Sunazuka et al. |
| 2018/0108241 A1 | 4/2018 | Wong et al. |
| 2019/0084107 A1* | 3/2019 | Yabuguchi ................ H02P 6/24 |
| 2019/0280639 A1* | 9/2019 | Trinkle ................ A01D 34/416 |

FOREIGN PATENT DOCUMENTS

| | | |
|---|---|---|
| CN | 106163354 A | 11/2016 |
| CN | 207443565 U | 6/2018 |
| CN | 109870944 A | 6/2019 |
| EP | 3536461 A1 | 9/2019 |
| FR | 3039087 A1 | 1/2017 |
| JP | 2017509493 A | 4/2017 |
| JP | 2018512119 A | 5/2018 |
| JP | 2018140447 A | 9/2018 |
| JP | 2019107717 A | 7/2019 |

OTHER PUBLICATIONS

Search Report and Office Action for Swedish Application No. 1950912-4 mailed on Jan. 30, 2020.

* cited by examiner

TOOL DETECTION IN HAND-HELD POWER TOOLS

TECHNICAL FIELD

The present invention relates to a tool detection device and a method for tool detection, and in particular to a power-driven tool detecting handheld multi-tool device and a method for tool detection for use with hand-held multi-power tools such as gardening and/or forestry equipment.

BACKGROUND

Lately hand-held power tools used for gardening and/or forestry are becoming more and more adaptable and flexible. One popular example of a multi-tool is the combined grass trimmer and brush cutter, where a single tool can be used for both purposes, by simply exchanging the tool head of the tool, a line holder for operating as a grass trimmer and a cutting blade for operating as a brush cutter.

At the same time, power tools are also becoming more and more advanced offering tool specific functions such as reversing the rotational direction or adapting the acceleration or the speed of rotation. However, not all tools may be used with all functions. While reversing the rotational direction may be useful for a grass trimmer allowing for both feeding the cutting line and for changing the direction of expelling cut grass, a cutting blade is not generally adapted for a change of rotation as the blade may then become damaged or loosened.

The U.S. patent published as U.S. Pat. No. 10,206,329 B2 discloses a method of controlling operation of a hand-held power tool may include receiving information indicative of a type of cutting equipment attached to the hand-held power tool based on operation of a working assembly in a selected direction of rotation. The working assembly may be configured to be bi-directionally rotatable to perform a cutting function using cutting equipment attachable to the handheld power tool. The method may further include determining the type of cutting equipment attached based on the received information, and selectively inserting an operational constraint on the working assembly based on the type of cutting equipment and a selected direction of rotation for the working assembly. Specifically, the information is provided by determining the inertia of the type of cutting equipment which is determined by simply accelerating the cutting equipment and measuring the workload exerted on the driving motor or the drive shaft for doing so.

However, as the inventors of the present invention have further realized, the manner taught by the prior art may not be sufficient for differentiating between cutting tools.

There is thus a need for a device and a method for providing an improved manner of determining the type of tool that is able to differentiate between objects of similar weight.

For the purpose of this application, the term forestry will be taken to also include the actual maintenance of the forest, including activities such as felling.

SUMMARY

An object of the present teachings is to overcome or at least reduce or mitigate the problems discussed in the background section.

According to one aspect a hand-held multi-tool device is provided, the hand-held multi-tool device a driving unit and being arranged to carry one of a plurality of replaceable tool heads to be driven by the driving unit, the hand-held multi-tool device further comprising a controller configured to determine a baseline inertial characteristic; determine an active inertial characteristic; and determine a tool type for the tool head based on the active inertial characteristic and the baseline inertial characteristic.

This has the benefit that the multi-tool is enabled to differentiate between tool heads even when the circumstances have changed and/or when two tool heads have similar inertial characteristics.

In one embodiment the controller is further configured to implement settings for the tool head based on the determined tool type. By tool head specific settings of e.g. speed and acceleration, the sound pressure level, energy consumption and performance can be optimized for each different tool head. Another advantage is that damage—or at least the risk of—caused by or to the tool head may be reduced.

In one embodiment the controller is further configured to determine the baseline inertial characteristic by providing a first energy level through the driving unit, and to determine the active inertial characteristic by providing a second energy level through the driving unit, wherein the second energy level is higher than the first energy level to cause an acceleration of the tool head.

In one embodiment the controller is further configured to determine the baseline inertial characteristic by providing the first energy level through the driving unit before providing the second energy level.

In one embodiment the controller is further configured to determine the baseline inertial characteristic by providing the first energy level through the driving unit after providing the second energy level.

In one embodiment the second energy level corresponds to 50-70% of a maximum torque for the driving unit.

In one embodiment the controller is further configured to determine the active inertial characteristic by accelerating the tool head in the range of 5 to 25% of a nominal speed.

In one embodiment the controller is further configured to determine the baseline inertial characteristic by running the tool head at a free-run state.

In one embodiment the hand-held multi-tool device further comprises a sensing device, wherein the controller is further configured to receive sensor data from the sensing device and to determine the baseline inertial characteristic and/or determine the active inertial characteristic based on the received sensor data.

In one embodiment the controller is further configured to store characteristics for the determined tool type; perform a second determination to determine a second baseline inertial characteristic and determine a second active inertial characteristic; and to determine if there is a change in inertial characteristics; and if so issue a notification.

In one embodiment the hand-held multitool device is a tool for gardening or forestry, such as a stringtrimmer, brushcutter, clearing saw or a combination trimmer tool. In one embodiment the tool head is any taken from the general type group comprising, but not limited to, a brush cutter blade, a grass trimmer line drum, a chainsaw, and a hedge cutter.

In one embodiment the tool head is any taken from a specific type group comprising, but not limited to, a brush cutter blade of a first shape, a brush cutter blade of a second shape, a grass trimmer line drum for a line of a first type, a grass trimmer line drum for a line of a second type.

In one embodiment the tool head is any taken from a specific type group comprising, but not limited to, a brush cutter blade of a first shape, a brush cutter blade of a second shape, a chainsaw of a first type, a chainsaw of a second type, a grass trimmer line drum for a line of a first type, a grass trimmer line drum for a line of a second type, a hedge cutter with a first set of teeth, and a hedge cutter with a second set of teeth.

In one embodiment the settings are related to one or several taken from the group comprising, but not being restricted to: speed, direction, and/or acceleration.

According to one aspect there is provided a method for determining a type of tool head in a hand-held multi-tool device, comprising a driving unit and being arranged to carry one of a plurality of replaceable tool heads to be driven by the driving unit, wherein the method comprises: determining a baseline inertial characteristic; determining an active inertial characteristic; and determining a tool type for the tool head based on the active inertial characteristic and the baseline inertial characteristic.

According to one aspect here is provided a circuitry arrangement for determining a type of tool head in a hand-held multi-tool device, comprising a driving unit and being arranged to carry one of a plurality of replaceable tool heads to be driven by the driving unit, wherein the circuitry arrangement comprises: a circuitry arranged for determining a baseline inertial characteristic; a circuitry arranged for determining an active inertial characteristic; and a circuitry arranged for determining a tool type for the tool head based on the active inertial characteristic and the baseline inertial characteristic.

According to one aspect there is provided a computer-readable medium carrying computer instructions that when loaded into and executed by a controller of a hand-held multi-tool device enables the viewing device to implement a method according to herein.

Further embodiments and advantages of the present invention will be given in the detailed description.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1A:
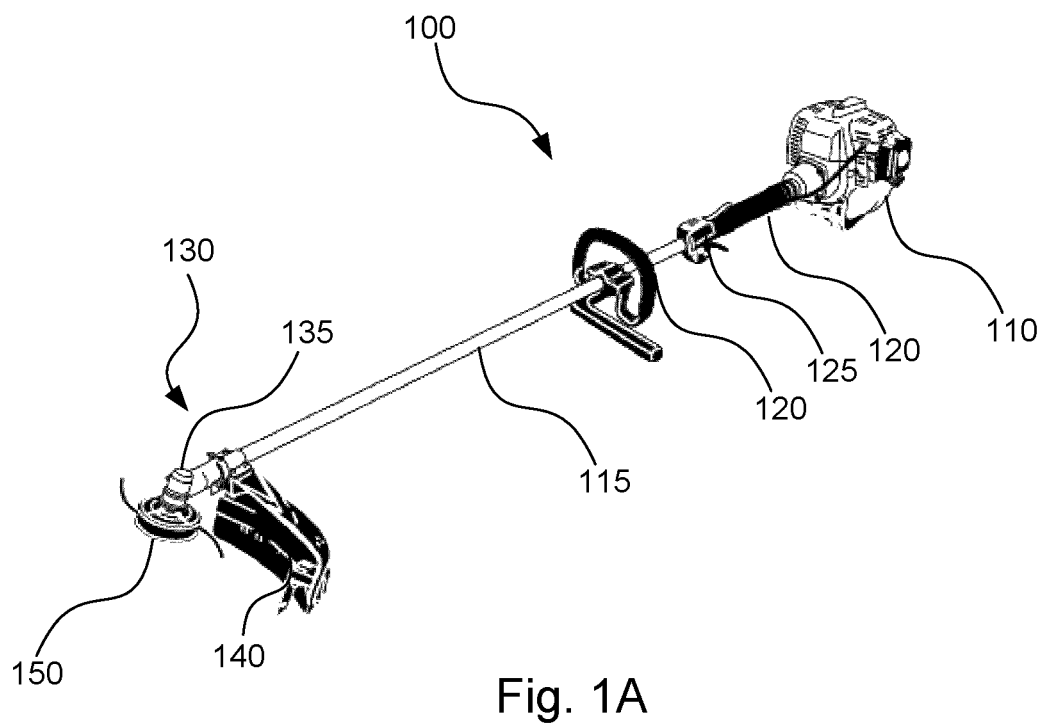
FIG. 1A shows a schematic view of a hand-held multi-tool device according to an embodiment of the present invention.

FIG. 1A shows a schematic view of a hand-held multi tool device, in the form of a hand-held trimmer. The multi-tool device 100 comprises a housing 110, arranged to house a driving unit (not shown in FIG. 1, but referenced 105 in FIG. 2), an elongated member 115, such as a pole, a tool assembly 130, and a user control device 125. The elongated member 115 may be arranged with one or more handles 120 and the user control device 125. The user control device 125 is preferably arranged adjacent or as part of a handle 120 for easy access.

The tool assembly 130 comprises a replaceable tool head 150, in FIG. 1A illustrated with a trimmer head, and a nose gear head 135. The tool head is replaceable, by being removably attachable to the multi-tool device 100. The nose gear head 135 is arranged for connecting the tool head 150 to the multi-tool device 100 and comprises a gear assembly for transferring driving force to the tool head 150. As there are many known variations and alternatives for removably attaching a tool head 150 to a multi-tool device 100 and for transferring the driving force to the tool head 150, the present specification will not focus on such variations and alternatives.

Figure 1B:
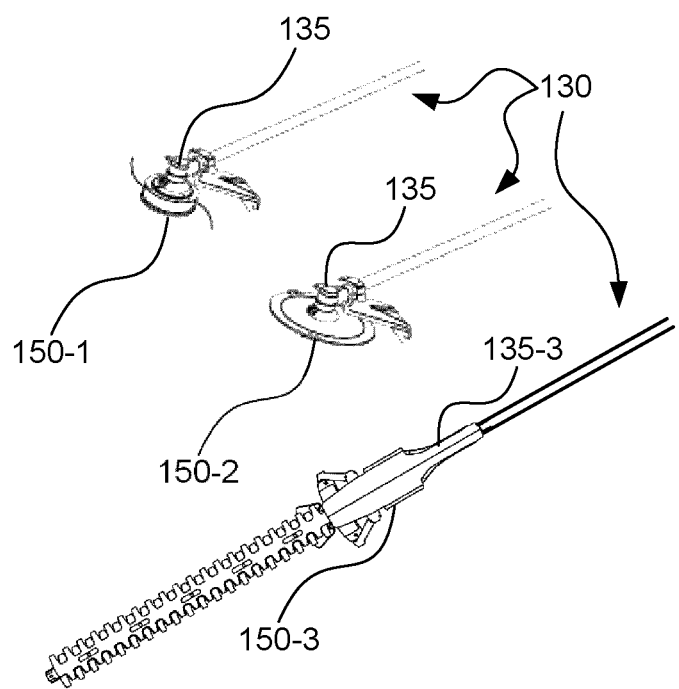
FIG. 1B shows a schematic view of a part of a hand-held multi-tool device, in the form of a combination trimmer tool, carrying different tool heads according to an embodiment of the present invention.

FIG. 1B shows a schematic view of a part of a hand-held multi power tool 100, in the form of a combination trimmer tool, where the tool assembly 130 is adapted in three different manners; by having a grass trimmer tool head 150-1 in a first instance, a brush cutter cutting blade 150-2 in a second instance and a hedge cutter 150-3 assembly in a third instance. Other examples of tool heads are, but not limited to, (pole) chainsaws, tillers, cultivators, or cutters. For combination trimmer tools, as well as for e.g. brushcutters, the tool heads may be of different general types.

It should also be noted that the teachings herein may also be used to differentiate between different types of the same type of tool heads 150, for example different shapes of brush cutter blades (number of arms, round, etc.). In such embodiments, the tool heads are of the same general type, but different specific types, where a specific type is a type within a general type. Examples of specific types are: a brush cutter blade of a first shape (round) or a brush cutter blade of a second shape (different number of cutting arms); a chainsaw of a first type or a chainsaw of a second type (length and/or chain may differ); a grass trimmer line drum for a line of a first type (e.g. plastic) or a grass trimmer line drum for a line of a second type (e.g. metal); a hedge cutter with a first set of teeth, and a hedge cutter with a second set of teeth (spacing, number and/or size may differ).

As can be seen the nose gear head 130 may be the same when using different tool heads 150 (first and second instance), or it may be augmented or adapted as can be seen in the third instance, showing an augmented nose gear head 130-3.

Figure 2:
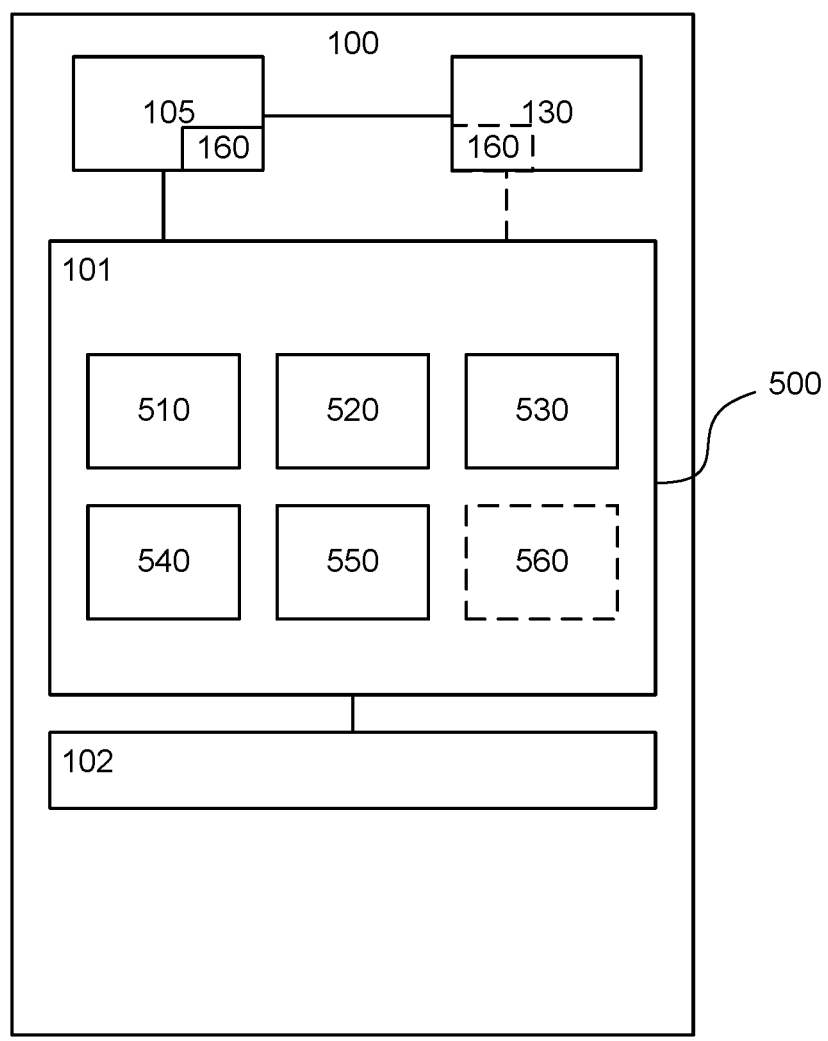
FIG. 2 shows a schematic view of the components of a hand-held multi-tool device according to one embodiment of the teachings herein.

FIG. 2 shows a schematic component view of a multi-tool device 100 according to the teachings herein. As is discussed with relation to FIG. 1A, the multi-tool device 100 comprises a driving unit 105 which is arranged to drive the tool assembly 130, or more specifically, the tool head 150 of the tool assembly through the nose gear head 135. The driving unit 105 may be electrical comprising a battery or connections for being connected to a battery or power socket or other electrical power source. Alternatively, the driving unit may be of a combustion type comprising a combustion engine and a fuel tank, or a connection for being connected to a fuel tank or other source of fuel.

The multi-tool device 100 further comprises a controller (not shown in FIG. 1, but referenced 101 in FIG. 2). The controller may be housed in the housing 110. Alternatively or additionally, the controller 101 may be housed in a user control device 125. Through the user control device 125, a user may control the multi-tool device by the user control device providing control data to the controller 101.

The controller 101 is configured to control the overall operation of the multi-tool device 100, and more specifically for controlling the driving unit and/or the tool assembly 130, such as for controlling the rotational speed and/or rotational direction of a tool head 150.

In one embodiment, the controller 101 is a general purpose controller. In one embodiment, the controller 101 is a combination of specific controllers and a general purpose controller. As a skilled person would understand there are many alternatives for how to implement a controller, such as using Field-Programmable Gate Arrays circuits, ASIC, CPU, etc in addition or as an alternative. For the purpose of this application, all such possibilities and alternatives will be referred to simply as the controller 101.

The multi-tool device 100 also comprises a memory 102. The memory 102 is configured to store settings, data and computer-readable instructions that when loaded into the controller 101 indicates how the multi-tool device 100 is to be controlled. The memory 102 may comprise several memory units or devices, but they will be perceived as being part of the same overall memory 102. There may be one memory unit for the driving unit (especially in the case of an electrical driving unit 105) and one memory unit for the tool assembly 130. As a skilled person would understand there are many possibilities of how to select where data should be stored and a general memory 102 for the multi-tool device 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

The multi-tool device 100 further comprises a sensing device 160 which is arranged to sense a characteristic that is indicative of the inertia of the tool head 150. In one such embodiment, the characteristic may be used to derive the inertia of the tool head 150 or an inertial characteristic indicative of the inertia of the tool head 150. The sensing device 160 is arranged to transmit sensor data that is received by the controller 101, and that indicates the sensed characteristic or indicates data that may be used to determine the characteristic.

In one embodiment, the sensing device is arranged to sense the load exerted by the tool head 150, i.e. the inertia of the tool head 150.

In one embodiment, the sensing device 160 is arranged to sense the torque exerted on a driving shaft of the driving unit 105.

In an alternative or additional embodiment, the sensing device 160 is arranged to sense the power delivered by the driving unit 105.

In an alternative or additional embodiment, the sensing device 160 is arranged to sense the torque exerted on the nose gear head 135 of the tool assembly 130, as is indicated by the dashed lines of the box representing the sensing device 160 in the tool assembly 130.

In an alternative or additional embodiment, the sensing device 160 is arranged to sense a time for reaching a specified (rotational) speed, which is indicative of an acceleration that may be compared to an expected acceleration thereby indicating the inertia of the tool head 150.

In an alternative or additional embodiment, the sensing device 160 is arranged to sense a speed after a specified time, which is indicative of an acceleration that may be compared to an expected acceleration thereby indicating the inertia of the tool head 150.

As would be clear to a skilled person, there are many different manners of determining the inertia of the tool head 150. As a skilled person would also understand it may not be necessary to actually determine the actual inertia of the tool head 150, but it may suffice to determine or sense a characteristic that is indicative of the inertia of the tool head 150. Such characteristics may be, as is also exemplified above; torque, power delivered, load exerted, time, speed, and so on.

The inventors have realized that when using other tools than only a line drum and a brush cutter, it is not only the weight that is primarily important to the inertia and it may thus be difficult to differentiate between two tool heads based simply on the inertia. For example, the difference in inertia between a line drum and a brush cutting blade is substantial, but the same may not be true for the difference between a pole chainsaw and a hedge cutter. And also, it may not be true for tool heads of the same general type, but of different specific types, such as the case with brush cutting blades of different sizes.

The inventors have also realized that for all tools, it is not only the weight that is primarily important to the inertia, but also the general condition of the tool head (and the multi-tool device 100 in general) and the surroundings. For example, as mentioned in relation to FIG. 1B, different tools may require different nose gear heads 135 which affect the overall inertia sensed. Furthermore, the temperature may affect the friction for driving the tool head 150, as may the current state of lubrication, how dirty the tool is, the general condition of the tool, wear and tear of the tool head or the multi-tool device and so on.

As all these factors may influence the sensed or rather derived inertia, the prior art manners may not be accurate enough to differentiate between all the various tool heads available to multi-tool devices—as the inventors have realized.

The inventors have therefore devised a manner of differentiating between two tools (or tool heads 150), by establishing a baseline inertial characteristic and compare the active inertial characteristic of the tool during acceleration, or active inertial characteristic, to the baseline inertial characteristic. In the following, an inertial characteristic is to be understood as the inertia or a characteristic that may be used to derive the inertia of the tool head, or to derive another characteristic dependent on or influenced by the inertia.

Figure 3:
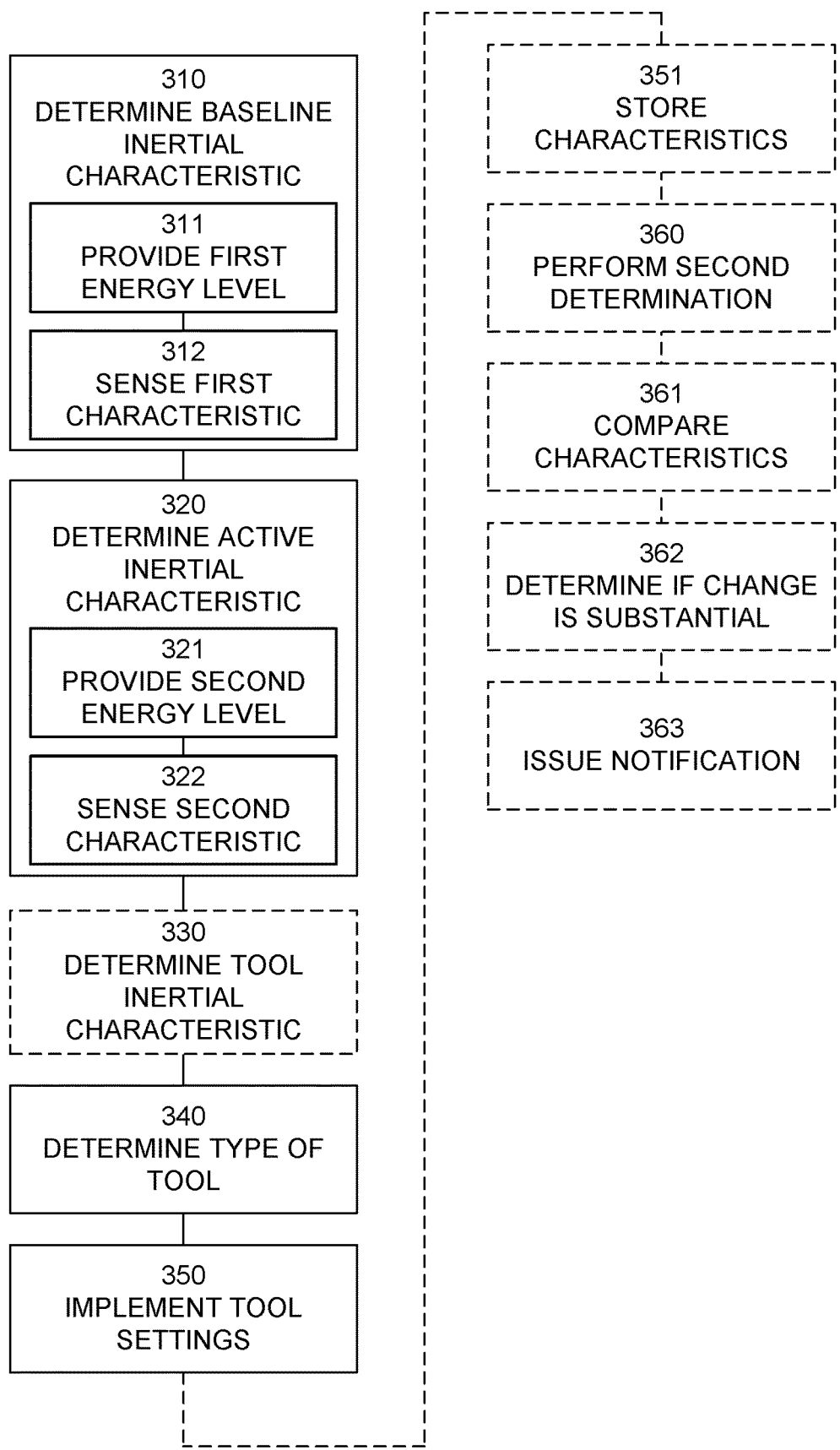
FIG. 3 shows a flowchart of a general method according to an embodiment of the present invention.

FIG. 3 shows a schematic view of a flowchart of a general method according to the teachings herein. To determine the type of tool head 150 currently attached to a multi-tool device 100, the controller 101 is configured to determine 310 a baseline inertial characteristic. The baseline inertial characteristic is determined by determining a characteristic during free-run of the tool assembly 130. The free-run characteristic may be determined by running the tool head 150 without accelerating it. The amount of for example torque required to keep the tool operating (without any load being applied) indicates the current condition of the multi-tool device 100 and may be used as a baseline. Alternatively or additionally, the baseline inertial characteristic may be determined by allowing the tool head 150 to settle after an acceleration, i.e. sense at what level the tool head 150 settles after having been accelerated. The settling speed and the power needed to maintain this speed are both indicative—alone or together—of the inertia of the tool head. This also indicates the current condition of the multi-tool 100 and may thus also be used as—or complement—the baseline. The baseline inertial characteristic may thus—in general terms—be determined by providing 311 a first energy level from the driving unit 105 to the driving of the tool head 150 and sensing 312 a first characteristic of the tool assembly 130, for example the torque.

The controller 101 is also configured to determine 320 an active or accelerated inertial characteristic. The active inertial characteristic is determined by accelerating the tool head 150 and sense a characteristic indicative of the acceleration, for example the energy or power required to accelerate the tool head, which is used to determine the inertial characteristic. The active inertial characteristic may thus—in general terms—be determined by accelerating 321 the tool head 150 by providing a second energy level from the driving unit 105 to the driving of the tool head 150 and sensing 322 a characteristic of the tool assembly 130, for example the speed. It should be noted that the second energy level is higher than the first energy level to provide the acceleration.

As the baseline inertial characteristic and the active inertial characteristic have been determined, the controller 101 is configured to determine 330 the tool inertial characteristic. The tool inertial characteristic is in one embodiment determined by simply subtracting the baseline inertial characteristic from the active inertial characteristic. The manner of determining the tool inertial characteristic depends on the actual characteristics used, and many variations exist for doing so. As is indicated by the dashed box for 330 determining the tool inertial characteristic, this may be omitted and simply determining the tool type based on the baseline and active inertial characteristics. However, a determination of the tool inertial characteristic may be seen as implicit in such a direct determination of the tool type based on the baseline and the active inertial characteristics.

As the tool inertial characteristic is determined, the controller 101 is configured to determine 340 the type of tool head based on the tool inertial characteristic. In one embodiment, the type of tool is determined by matching the tool inertial characteristic to a type of tool, for example by a table lookup in a table stored in the memory.

Figure 4:
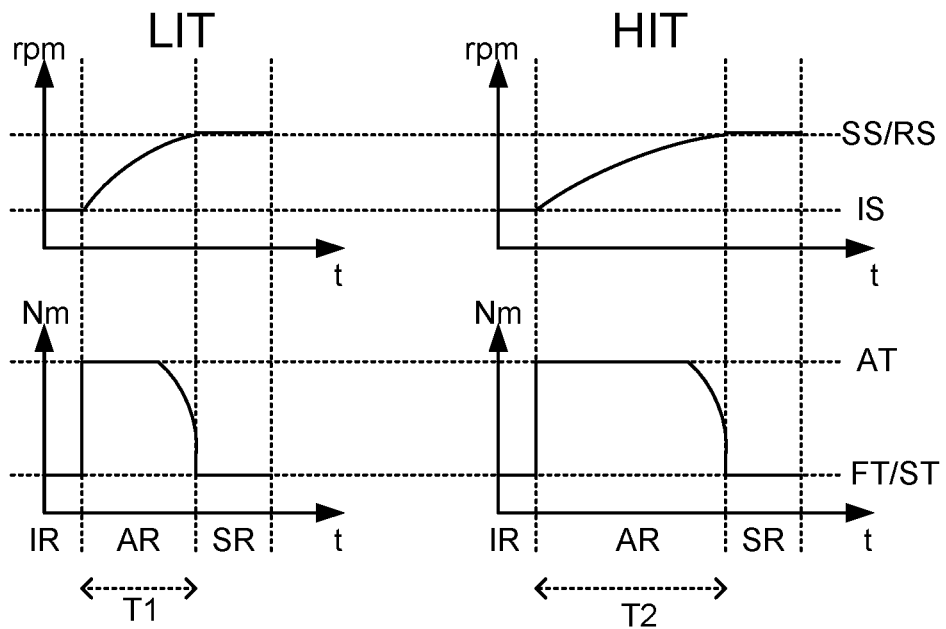
FIG. 4 shows time-graphs for a low inertia hand-held multi-tool device and a high inertia hand-held multi-tool device.

FIG. 4 shows a comparison of the behavior of two tool heads, one having a high inertia and one having a low inertia. To the left, there are two graphs representing the behavior of a low inertia tool head (LIT) and to the right, there are two graphs representing the behavior of a high inertia tool head (HIT). For both tool heads, the upper graph represents the speed (rpm) as a function of time (t) and the lower graph represents the torque (Nm) in the driving unit as a function of time (t).

Dashed vertical lines indicate separation of different phases of the determination of the tool head. The left-most, or first, region is the initiation region (IR). Here the free-run torque (FT) and the initial speed (IS) are indicated by dashed horizontal lines. The initial speed may for example be 6% of the maximum (or nominal) speed. Either or both of the free-run torque (FT) and the initial speed (IS) may be used as indicators and are thus examples of baseline inertial characteristics. The next, or middle, region is the acceleration region (AR) where the tool head is accelerated. In the example of FIG. 4, the tool head 150 is accelerated until it reaches a specified speed (SS), for example 23% of the maximum (or nominal) speed. In the acceleration region an acceleration torque (AT) is applied, for example 65% of the maximum torque. As can be seen, the low inertia tool reaches its specified speed after a time T1 and the high inertia tool reaches the same specified speed after a time T2 when the same acceleration torque (AT) is applied. As can be seen by comparing the left upper graph and the right upper graph, the time for the low inertia tool T1 is significantly lower than the time for the high inertia tool T2. The time to reach a specified speed may thus be used to identify the tool head.

As a skilled person would realize after having taken part of the teachings herein, and as the inventors realized by themselves, there are many variations in how to determine the inertia. For example, by applying the acceleration torque for a specified time (T=T1=T2) and then sense the resulting speed (RS). The difference between the resulting speed and the initial speed is the result of the acceleration and thus indicative of the inertia of the tool head.

A final or third region is also illustrated, the settling region (SR), where the tool head is allowed to settle at the resulting speed. The torque required to maintain this speed (the settling torque, ST) is indicative of e.g. the friction in the tool drive train or any external load on the tool and may be used as or to complement the baseline inertial characteristic.

In one alternative or complementary embodiment, the baseline inertial characteristic is determined while allowing the tool to coast.

In one alternative or complementary embodiment, the acceleration inertial characteristic is determined while allowing the tool to decelerate.

In one alternative or complementary embodiment, the baseline inertial characteristic and/or the acceleration inertial characteristic are determined while varying the speed of the tool in repeated manner, such as a sinusoidal, a saw tooth or a rectangular wave.

Based on the determined tool type, various tool settings may then be implemented 350 by the controller 101. One example of such tool settings is to apply or enforce restrictions for the tool. The restrictions may apply to the rotational direction, rotational speeds, acceleration(/deceleration being a negative acceleration) level, rotational speeds in a direction and/or acceleration levels in a direction, trigger response (response time), maximum power, maximum torque, starting behavior, activating functions such as changing direction and/or line-feed.

Restrictions related to a rotational direction may indicate a maximum speed and/or maximum acceleration in the given rotational direction (for example, not allowing any rotation in the given direction), in order to reduce the risk of a tool head 150 or a part thereof becoming loosened. Such restrictions may also relate to the number of times a direction may be changed as a repeated change of direction may serve to loosen a tool head or part thereof.

Restrictions related to a rotational speed may indicate a maximum speed and/or maximum acceleration, in order to reduce the risk of a tool head 150 or a part thereof becoming loosened or damaged.

The determination of the tool head 150 is thus ended by a determination 350 of which restrictions to apply, if any, based on the determined tool head 150.

Not only restrictions may be associated with a tool head 150, but also preferred or nominated speeds may be associated with a tool head. Therefore, not only restrictions are applied, but settings in general may be applied. The settings may be stored in the memory 102. The settings are implemented by the controller 101 controlling the drive unit 105 accordingly.

In one embodiment, the first energy level is approximately 1-5% of maximum energy possible to deliver by the driving unit 105, or an energy level corresponding to 1-5% of the maximum torque, indicating a free-run of the tool head 150. In one such embodiment, the multi-tool device 100 is thus arranged to determine the baseline inertial characteristic, by the controller 101 determining the baseline inertial characteristic during a free-run of the tool, which may be done before or after (or both) an acceleration.

In one embodiment, the first energy level is substantially zero, indicating that the tool head is allowed to settle, such as straight after an acceleration.

In one embodiment, the second energy level corresponds to approximately 50-70%, or 65% of the maximum torque.

In one embodiment the tool head 150 is accelerated within a range of 5-25% of the nominal speed (which for a trimmer is 7500 rpm). In one embodiment, the tool head 150 is accelerated from 5% to 25% of the nominal speed.

The inventors have realized that as it is unknown what type of tool head is used during the determination of the tool head type, the speed used during the determination must be kept below the maximum speed as the tool would otherwise possibly exceed restrictions placed on the tool.

The embodiments above, and herein, reduces the risk of the tool exceeding a restriction in a manner that may be harmful by for example staying below 70% of maximum torque, and/or staying under 25% of maximum speed. By not revving up the tool to its maximum, the determination will also not be disturbing to a user.

The determination should also be kept short time-wise to reduce the risk of damage and to not be disturbing to a user. This is achieved by an applied torque of between 50-65% of the maximum torque while cutting out at a speed of under 25% of the maximum (nominal) speed.

The inertial characteristic, such as the torque, of the tool assembly may be sensed directly at the tool head 150 and/or the nose gear head 135 by the sensing device 160 as discussed in relation to FIG. 1B. The inertial characteristic, such as the torque, of the tool assembly may also or alternatively be sensed at the driving unit 105 by the sensing device 160 as discussed in relation to FIG. 1B. The inertial characteristic may also be sensed by a combination of the controller and the sensing device, where the controller 101 determines a characteristic based on input received from the sensing device 160, such as when determining the time required for the tool head 150 to assume a specific speed, where the speed is sensed by the sensing device 160 and the time is sensed by the controller 101.

The method herein may also, or alternatively, be used to determine the maximum free-run torque or inertial characteristic and use this as a validity check of the tool assembly 130 in order to protect from possible errors at high external loads. This enables for a check of—and provides for—an increased robustness of the tool.

The determination may be performed at activation or startup of the tool, e.g. at the first instance when the user presses the trigger after the product is activated Performing the determination at startup like this is beneficial in that most likely the tool is not subjected to any loads that will affect the determination when the user first presses the trigger after activation of the product. Also, the user's cutting operation will not be affected by the determination as the user most likely has not started the operation yet. The determination may alternatively or additionally be performed upon user initiation.

The determination may also be performed during operation and for the same tool head in order to notice any changes in inertia which may be indicative of damage to (or wear and tear of) the tool head. If such a change is detected that exceeds a threshold level, which may be specific to the determined tool head 150, a notification may be given to the user to change or at least see to the tool head 150. The controller 101 is thus configured to store 351 the determined inertial characteristics (and/or other characteristics) for a determined tool head 150, and to perform a second determination 360 and compare 361 the second inertial characteristics to the stored characteristics and determine 362 if they have changed (significantly as in the change exceeding a threshold) and if so issue 363 a notification, possibly to the user.

Figure 5:
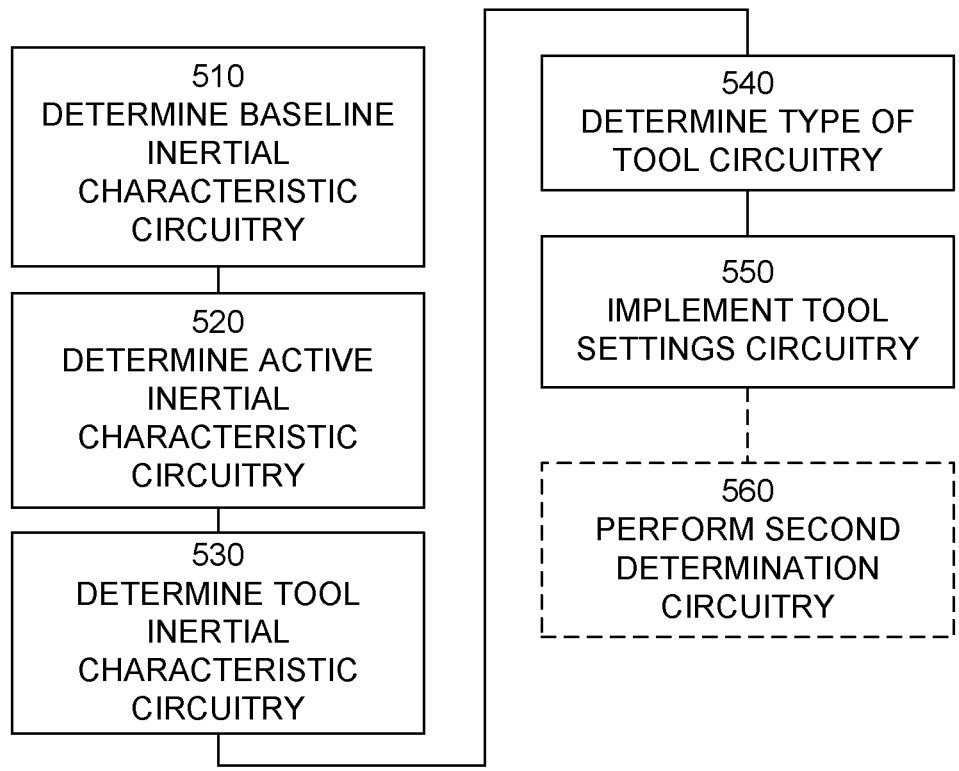
FIG. 5 shows a component view for a circuitry arrangement according to an embodiment of the teachings herein.

Returning to FIG. 2, which shows a component view for a circuitry arrangement 500 to be used in a multi-tool device 100 according to an embodiment of the teachings herein. FIG. 5 also shows a schematic view of a circuitry arrangement to be used in a multi-tool device 100 according to the teachings herein and will be describes simultaneously as FIG. 2 is discussed. The circuitry arrangement 500 comprises circuitry 510 arranged for determining a baseline inertial characteristic and circuitry 520 arranged for determining an active inertial characteristic. The circuitry arrangement 500 further comprises circuitry arranged for 530 determining a tool inertial characteristic, circuitry 540 arranged for determining the type of tool based on the determined tool inertial characteristic and circuitry 550 arranged for implementing tool settings. The circuitry arrangement 500 may in one embodiment further comprise circuitry arranged for 560 determining if a (substantial) change has occurred in a characteristic and if so issue a notification.

FIG. 5 also shows a component view for a circuitry arrangement 500 to be used in a multi-tool device 100 according to an embodiment of the teachings herein, but in more detail. The circuitry arrangement 500 is adapted to be used in a multi-tool device 100 as taught herein.

In one embodiment, the circuitry arrangement 500 comprises circuitry 510 for determining a baseline inertial characteristic. The circuitry arrangement 500 further comprises circuitry 520 arranged for determining an active inertial characteristic; and circuitry 540 arranged for determining a tool type for the tool head 150 based on the active inertial characteristic and the baseline inertial characteristic.

Figure 6:
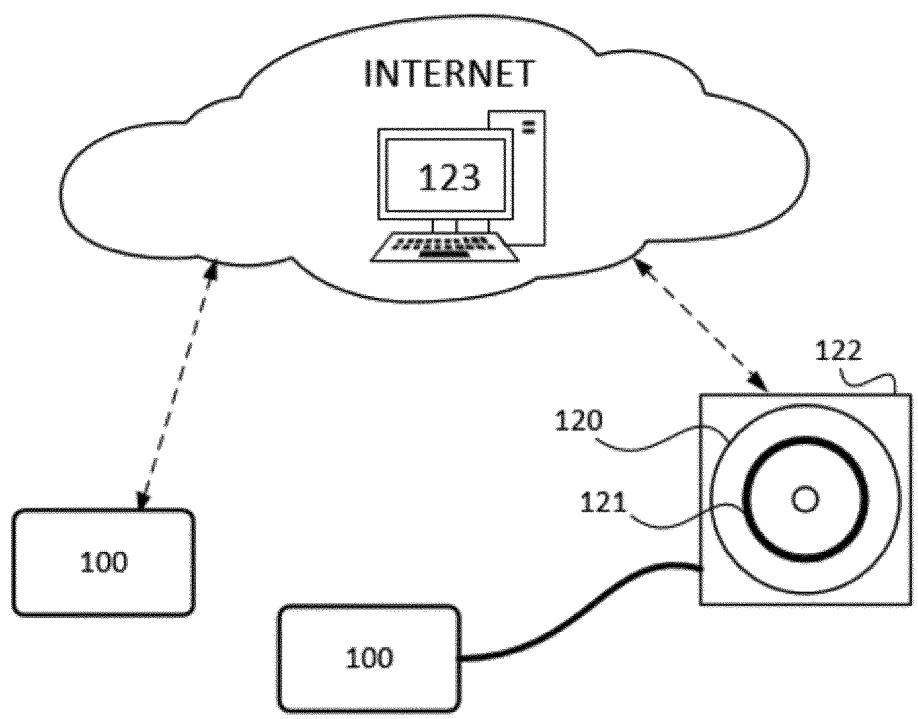
FIG. 6 shows a schematic view of a computer-readable medium carrying computer instructions that when loaded into and executed by a controller of a viewing device enables the viewing device to implement an embodiment of the present invention.

FIG. 6 shows a schematic view of a computer-readable medium 120 carrying computer instructions 121 that when loaded into and executed by a controller of a multi-tool device 100 enables the multi-tool device 100 to implement the present invention.

The computer-readable medium 120 may be tangible (or non-transitory) such as a hard drive or a flash memory, for example a USB memory stick or a cloud server. Alternatively, the computer-readable medium 120 may be intangible (or transitory) such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the multi-tool device 100 for being executed by the controller 101.

The computer disc reader 122 may also or alternatively be connected to (or possibly inserted into) a multi-tool device 100 for transferring the computer-readable computer instructions 121 to a controller of the hand-held multi-tool device (presumably via a memory of the object detection multi-tool device 100).

FIG. 6 shows both the situation when a multi-tool device 100 receives the computer-readable computer instructions 121 via a server connection and the situation when another object detection multi-tool device 100 receives the computer-readable computer instructions 121 through a wired interface. This enables for computer-readable computer instructions 121 being downloaded into a multi-tool device 100 thereby enabling the multi-tool device 100 to operate according to and implement the invention as disclosed herein.

The invention claimed is:

1. A hand-held multi-tool device comprising a driving unit and being arranged to carry one of a plurality of replaceable tool heads to be driven by the driving unit, the hand-held multi-tool device further comprising a controller configured to:
   determine a baseline inertial characteristic;
   determine an active inertial characteristic; and
   determine a tool type for the tool head based on the baseline inertial characteristic being subtracted from the active inertial characteristic,
   wherein the controller is further configured to determine the baseline inertial characteristic by running the tool head at a free-run state,
   wherein the free-run state is a state with a minimum amount of torque required to run the tool head with zero change in acceleration,
   wherein the baseline inertial characteristic and the active inertial characteristic are torque measurements to achieve a target acceleration, and
   wherein the controller is further configured to implement settings for the tool head based on the determined tool type.

2. The hand-held multi-tool device according to claim 1, wherein the settings are related to one or several taken from the group comprising: speed, direction, and acceleration.

3. The hand-held multi-tool device according claim 1, wherein the controller is further configured to:
   determine the baseline inertial characteristic by providing a first energy level through the driving unit, and to
   determine the active inertial characteristic by providing a second energy level through the driving unit,
   wherein the second energy level is higher than the first energy level to cause an acceleration of the tool head.

4. The hand-held multi-tool device according to claim 3, wherein the controller is further configured to determine the baseline inertial characteristic by providing the first energy level through the driving unit before providing the second energy level.

5. The hand-held multi-tool device according to claim 3, wherein the controller is further configured to determine the baseline inertial characteristic by providing the first energy level through the driving unit after providing the second energy level.

6. The hand-held multi-tool device according to claim 3, wherein the second energy level corresponds to 50-70% of a maximum torque for the driving unit.

7. The hand-held multi-tool device according to claim 1, wherein the controller is further configured to determine the active inertial characteristic by accelerating the tool head in a range of 5 to 25% of a nominal speed.

8. The hand-held multi-tool device according to claim 1, further comprising a sensing device, wherein the controller is further configured to:
   receive sensor data from the sensing device and to
   determine the baseline inertial characteristic and/or
   determine the active inertial characteristic based on the received sensor data.

9. The hand-held multi-tool device according to claim 1, wherein the controller is further configured to:
   store characteristics for the determined tool type;
   perform a second determination to
   determine a second baseline inertial characteristic and
   determine a second active inertial characteristic; and to
   determine if there is a change in inertial characteristics; and if so
   issue a notification.

10. The hand-held multi-tool device according to claim 1, wherein the hand-held multi-tool device is a tool for gardening or forestry.

11. The hand-held multi-tool device according to claim 1, wherein the hand-held multi-tool device is a string trimmer, brushcutter or clearing saw.

12. The hand-held multi-tool device according to claim 1, wherein the hand-held multi-tool device is a combination trimmer tool.

13. A method for determining a type of tool head in a hand-held multi-tool device, comprising a driving unit and being arranged to carry one of a plurality of replaceable tool heads to be driven by the driving unit, wherein the method comprises:
   determining a baseline inertial characteristic;
   determining an active inertial characteristic; and
   determining a tool type for the tool head based on the baseline inertial characteristic being subtracted from the active inertial characteristic,
   wherein determining the baseline inertial characteristic includes allowing the tool head to settle after acceleration and sensing at what torque measurement the tool head settles,
   wherein the baseline inertial characteristic and the active inertial characteristic are torque measurements to achieve a target acceleration, and
   wherein the controller is further configured to implement settings for the tool head based on the determined tool type.

* * * * *